(12) United States Patent
Wakazono et al.

(10) Patent No.: US 6,286,297 B1
(45) Date of Patent: Sep. 11, 2001

(54) STEAM COOLED TYPE COMBINED CYCLE POWER GENERATION PLANT AND OPERATION METHOD THEREOF

(75) Inventors: Osamu Wakazono, Tokyo; Yasushi Fukuizumi, Takasago, both of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/537,865

(22) Filed: Mar. 29, 2000

Related U.S. Application Data

(63) Continuation-in-part of application No. 09/108,234, filed on Jul. 1, 1998, now abandoned.

(30) Foreign Application Priority Data

Jul. 2, 1997 (JP) .................................................. 9-176945

(51) Int. Cl.[7] ...................................................... F02C 6/18
(52) U.S. Cl. ....................................... 60/39.02; 60/39.182
(58) Field of Search ............................... 60/39.02, 39.182; 122/7 B

(56) References Cited

U.S. PATENT DOCUMENTS

| 3,304,712 | 2/1967 | Pacault et al. ..................... 60/39.182 |
| 3,751,866 | 8/1973 | Sokolowski ........................ 60/39.182 |
| 3,930,367 | 1/1976 | Gasparoli ........................... 60/39.182 |
| 4,424,668 | * 1/1984 | Mukherjee ......................... 60/39.182 |
| 5,577,377 | * 11/1996 | Tomlinson ......................... 60/39.182 |
| 5,979,156 | * 11/1999 | Uematsu et al. ................... 60/39.182 |

FOREIGN PATENT DOCUMENTS 8-296410   11/1996   (JP) .

* cited by examiner

Primary Examiner—Louis J. Casaregola
(74) Attorney, Agent, or Firm—Wenderoth, Lind & Ponack, L.L.P.

(57) ABSTRACT

A combined cycle power generation plant comprises a waste heat recovery boiler (20) having a stabilizing burner (25) at an upstream position thereof The stabilizing burner is ignited during the time of start-up and speed increase of a gas turbine (11) so that steam generation at the waste heat recovery boiler is accelerated. The steam is used effectively for cooling the gas turbine, driving a steam turbine, and for gland steam. In addition, exhaust steam from the steam turbine is also used to cool the gas turbine. Consequently, the time for the plant to reach a full load can be shortened.

6 Claims, 1 Drawing Sheet

STEAM COOLED TYPE COMBINED CYCLE POWER GENERATION PLANT AND OPERATION METHOD THEREOF

This Application is a Continuation-in-Part application of Ser. No. 09/108,234, filed Jul. 1, 1998.

BACKGROUND OF THE INVENTION

1. Field of the Invention

The present invention relates to a combined cycle power generation plant, constructed by combining a gas turbine unit and a steam turbine unit, in which a stabilizing burner is incorporated in a waste heat recovery boiler thereof.

2. Description of the Prior Art

A combined cycle power generation plant is a power generation system constructed by combining a gas turbine unit and a steam turbine unit. A high temperature range of the power generation plant thermal energy is used by the gas turbine, and a low temperature range is used by the steam turbine. Thus, the thermal energy is recovered and used effectively, so that this type of power generation system has recently come to be widely used.

In such combined cycle power generation plant, it is an active tendency to employ a steam cooling method for cooling the gas turbine, steam turbine, etc. using a cooling medium comprised of steam generated in its own cycle. That is, according to this steam cooling method, a high temperature portion of the gas turbine, for example, is cooled by steam, and the thermal energy obtained thereby is recovered by a bottom cycle of the steam turbine. Consequently, a highly advantageous system having an enhanced thermal efficiency can be obtained.

However, in order to effect a restart of the plant after the plant has been stopped (such as for a plant start-up after completion of inspection work, a weekly start and stop (WSS) in which a start and stop of operation are done in weekly intervals, or a daily start and stop (DSS) in which a start and stop of operation are done in daily intervals), the steam for cooling must be obtained from outside of the plant's own cycle. For example, the plant must depend on the steam from an auxiliary boiler which is installed outside.

In order to obtain the steam, which is needed at the time the plant is restarted after the plant has been stopped, various additional facilities are needed. This results in a complex plant, increased cost, and troublesome operation. On the other hand, if dependence on the auxiliary boiler is avoided by only waiting for steam generation at the waste heat recovery boiler while the gas turbine is held in start-up and during speed increases, then an unfavorable situation occurs from the view point of resonance of the compressor and turbine blades.

SUMMARY OF THE INVENTION

In order to solve the problems in the prior art as mentioned above, it is an object of the present invention to provide a combined cycle power generation plant which is able to secure steam needed at the time a plant is restarted after the plant has been stopped (i.e., a start-up period of the operation of the plant). Moreover, it is an object to shorten the time for the plant to reach a full load from the start-up.

In order to attain these objects, it is a feature of the present invention to provide a combined cycle power generation plant constructed by combining a gas turbine unit and a steam turbine unit. The combined plant includes a waste heat recovery boiler for generating steam for driving the steam turbine by using waste heat from the gas turbine. In addition, a stabilizing burner is incorporated at an upstream position in the waste heat recovery boiler.

That is, the stabilizing burner, which is incorporated at the upstream position in the waste heat recovery boiler, is ignited during start-up and speed increases of the gas turbine so that generation of steam at the waste heat recovery boiler is accelerated. Thus, the steam is used effectively for cooling the gas turbine, driving the steam turbine and also as gland steam. In addition, exhaust steam from the high pressure steam turbine is also used to cool the gas turbine. Therefore, the time for the plant to reach a full load can be shortened.

It is another feature of the present invention to provide a combined cycle power generation plant as mentioned above, in which the stabilizing burner provided in the waste heat recovery boiler is constructed such that the stabilizing burner is supplied with fuel from a fuel supply source which is common to a combustor of the gas turbine.

It is also a feature of the present invention to provide a combined cycle power generation plant as first mentioned above, in which the stabilizing burner provided in the waste heat recovery boiler is constructed such that the stabilizing burner is supplied with fuel from a fuel supply source which is different from a fuel supply source of a combustor of the gas turbine.

DESCRIPTION OF THE PREFERRED EMBODIMENTS

Figure 1:
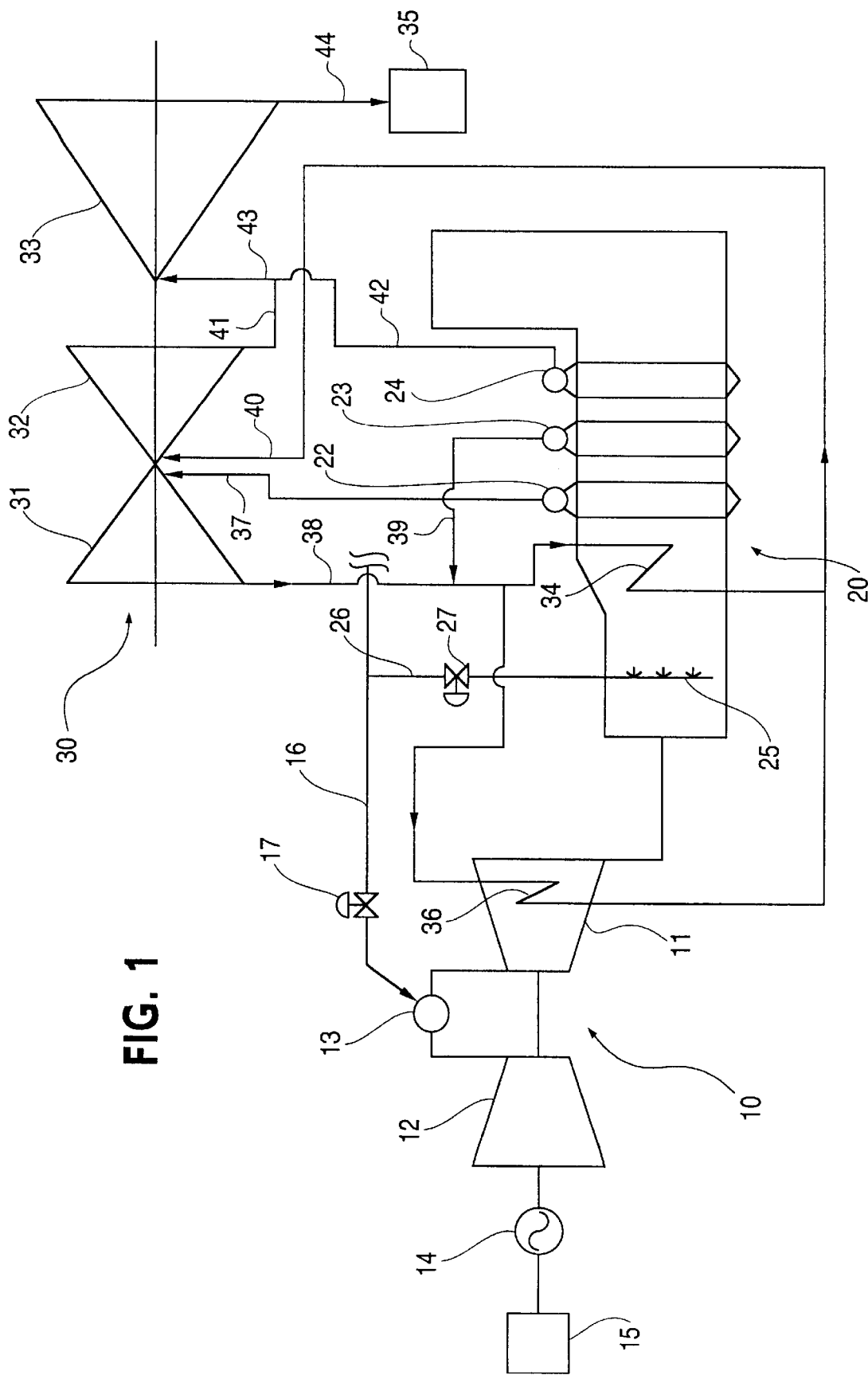
FIG. 1 is an explanatory view showing schematically a main part of a combined cycle power generation plant of one embodiment of the present invention.

One embodiment of the present invention will be described with reference to FIG. 1. FIG. 1 shows schematically a gas turbine unit, a steam turbine unit, and a waste heat recovery unit of a combined cycle power generation plant.

Numeral 10 designates the gas turbine unit which comprises a gas turbine 11 (including a high temperature portion having a cooling component 36), an air compressor 12 which has a shaft joined directly to a shaft of the gas turbine 11, a combustor 13 which is supplied with compressed air from the air compressor 12 for the combustion of fuel (which is supplied from another source). The combustor 13 supplies the gas turbine 11 with operation gas, etc. A generator 14 has a shaft which is joined to the other end of the shaft of the air compressor 12, and a starting apparatus 15 is connected to the generator 14. The gas turbine 11, air compressor 12 and generator 14 may also share single, continuous shaft.

Numeral 16 designates a fuel supply pipe and numeral 17 designates a control valve disposed in the supply pipe 16 for controlling the supply of fuel to the combustor 13. Numeral 20 designates the waste heat recovery unit comprising a waste heat recovery boiler which includes an economizer and a superheater, but neither of these are shown in FIG. 1. The waste heat recovery boiler 20 also includes a reheater 34, a high pressure drum 22, an intermediate pressure drum 23 and a low pressure drum 24.

Numeral 25 designates a stabilizing burner which is disposed at an upstream position, preferably at an upstream position of the superheater or the reheater, in the waste heat recovery boiler 20.

Numeral 26 designates a fuel supply pipe for supplying the stabilizing burner 25 with fuel. On a downstream side of the fuel supply pipe 26, there is disposed a control valve 27. An upstream end of the fuel supply pipe 26 joins the fuel supply pipe 16 for the combustor 13. Of course, the fuel supply pipes 16 and 26, respectively, may also be connected to separate fuel supply sources.

Numeral 30 designates the steam turbine unit comprising a high pressure steam turbine 31, an intermediate pressure steam turbine 32, and a low pressure steam turbine 33. High pressure steam, including steam 37 from the high pressure drum 22 of the waste heat recovery boiler, enters the high pressure steam turbine 31. Exhaust steam 38 from the high pressure turbine and/or intermediate pressure steam 39 from the intermediate pressure drum 23 of the waste heat recovery boiler flows into the high temperature portion cooling component 36 of the gas turbine 11 (for cooling purposes) and into the reheater 34 of the waste heat recovery boiler.

This steam from the reheater 34 and the high temperature portion cooling component 36 of the gas turbine 11 then becomes intermediate pressure steam 40 which enters the intermediate pressure steam turbine 32. Exhaust steam 41 from intermediate pressure steam turbine 32 and/or low pressure steam 42 from low pressure drum 24 of the waste heat recovery boiler enters the lower pressure steam turbine 33 as low pressure steam 43. Finally, exhaust steam 44 from low pressure steam turbine 33 enters a condenser 35.

In the present embodiment constructed as above, in order to restart the plant after the plant has been stopped (such as for a plant start-up after completion of inspection work, or for a WSS or DSS in which the start and stop of operation are done in weekly or daily intervals), the gas turbine 11 is started at first by the starting apparatus 15 via the air compressor 12. The stabilizing burner 25 is ignited during the spin rotation by the starting apparatus 15 so that heating of the waste heat recovery boiler 20 is started therewith.

The gas turbine 11 is increased in speed and load-increased as time passes (i.e., a speed-increasing period of the operation of the plant). Fuel supplied to the stabilizing burner 25 is controlled to correspond to the increase in load and speed of gas turbine 11 so that heating of the waste heat recovery boiler 20 by the stabilizing burner 25 is regulated.

According to the present embodiment, the stabilizing burner 25 is provided as mentioned above. Therefore, the temperature of inflow gas to the waste heat recovery boiler 20 can be maintained at a rated state from the starting time. In addition, steam generation at the waste heat recovery boiler 20 is accelerated so that the generated steam can be used quickly as a cooling medium for the high temperature portion cooling component 36 of the gas turbine 11, as an energy source for the steam turbine unit 30, or as gland steam.

In addition, exhaust steam from the high pressure steam turbine 31 can be used as an alternate or additional cooling medium for the high temperature portion cooling component 36 of the gas turbine 11.

Moreover, because these sources of cooling steam can be obtained so quickly as mentioned above, the speed increase and load increase of gas turbine 11 can be quickened, and the time for reaching a full load operation can be shortened.

Because exhaust steam 38 from the high pressure steam turbine 31 and steam generated by the stabilizing burner 25 (incorporated in the waste heat recovery unit 20) is used to cool the gas turbine 11, auxiliary steam from an auxiliary boiler becomes unnecessary. Therefore, there is no need to provide a particular surrounding piping system for the auxiliary steam, and the plant can be greatly simplified as a whole.

The present invention has been described with respect to one embodiment, but the present invention is not to be limited to that embodiment. Various modifications may be added to the base structure within the scope of the claims as set forth hereinbelow.

According to the present invention, provided is a combined cycle power generation plant constructed by combining a gas turbine unit and a steam turbine unit. A waste heat recovery boiler is provided for generating steam for driving the steam turbine by using waste heat from the gas turbine.

A stabilizing burner is incorporated at an upstream position in the waste heat recovery boiler. The stabilizing burner is ignited during the start-up and speed increase of the gas turbine so that the generation of steam at the waste heat recovery boiler is accelerated. This steam is used effectively for cooling of the gas turbine, as an energy source of the steam turbine, and further for a gland steam. Therefore, the time for the plant to reach a full load can be shortened. In addition, exhaust steam from the high pressure steam turbine is also used as a cooling medium for the gas turbine.

Moreover, according to the present invention so constructed, there is no need for auxiliary steam from an auxiliary boiler. Consequently, no particular surrounding piping system for the auxiliary steam is needed. Therefore, due to simplification of the plant, an economic effect thereof can be greatly enhanced.

We claim:

1. A method of operating a power generation plant, comprising:

supplying steam to a steam turbine unit such that an exhaust steam is expelled from the steam turbine unit;

operating a stabilizing burner at an upstream position in a waste heat recovery boiler during at least one of a start-up period of operation of the power generation plant so as to create steam when an operation of the power generation plant is started and a speed-increasing period of operation of the power generation plant so as to created steam when a speed of the power generation plant is increased;

generating steam in the waste heat recovery boiler, said steam generation including using waste heat from a gas turbine having a high temperature portion with a cooling component; and cooling the high temperature portion of the gas turbine by channeling at least one of a portion of the exhaust steam from the steam turbine unit and a portion of the steam generated in the waste heat boiler through the cooling component of the high temperature portion of the gas turbine.

2. The method of claim 1, wherein said supplying steam to the steam turbine unit comprises supplying high pressure steam to a high pressure steam turbine such that a high pressure exhaust steam is expelled from the high pressure steam turbine.

3. The method of claim 2, wherein said generation of steam in the waste heat recovery boiler comprises generating intermediate pressure steam in an intermediate pressure drum of the waste heat recovery boiler, said cooling of the high temperature portion of the gas turbine comprising channeling at least one of a portion of the high pressure exhaust steam from the high pressure steam turbine and a portion of the intermediate pressure steam from the intermediate pressure drum of the waste heat recovery boiler through the cooling component of the high temperature portion of the gas turbine.

4. The method of claim 1, further comprising controlling said operating of the stabilizing burner by regulating a fuel supply to the stabilizing burner based on a load of the gas turbine.

5. The method of claim 1, further comprising controlling said operating of the stabilizing burner by regulating a fuel supply to the stabilizing burner based on a speed of the gas turbine.

6. The method of claim 1, further comprising initiating an operation of the stabilizing burner by rotating a starting apparatus of the gas turbine.

* * * * *